United States Patent
Seo et al.

(10) Patent No.: US 9,059,761 B2
(45) Date of Patent: Jun. 16, 2015

(54) APPARATUS AND METHOD FOR TRANSMITTING DATA USING MULTIPLE ANTENNAS

(75) Inventors: Han Byul Seo, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 648 days.

(21) Appl. No.: 13/132,566

(22) PCT Filed: Dec. 1, 2009

(86) PCT No.: PCT/KR2009/007110
§ 371 (c)(1),
(2), (4) Date: Jun. 2, 2011

(87) PCT Pub. No.: WO2010/064827
PCT Pub. Date: Jun. 10, 2010

(65) Prior Publication Data
US 2011/0235567 A1 Sep. 29, 2011

Related U.S. Application Data

(60) Provisional application No. 61/119,379, filed on Dec. 3, 2008.

(30) Foreign Application Priority Data

Feb. 4, 2009 (KR) .................. 10-2009-0009012

(51) Int. Cl.
| | |
|---|---|
| H04B 7/00 | (2006.01) |
| H04L 27/28 | (2006.01) |
| H04L 1/02 | (2006.01) |
| H04B 7/06 | (2006.01) |
| H04L 5/00 | (2006.01) |
| H04B 7/04 | (2006.01) |
| H04L 25/02 | (2006.01) |
| H04L 25/03 | (2006.01) |
| H04W 52/28 | (2009.01) |

(52) U.S. Cl.
CPC ............ *H04B 7/0617* (2013.01); *H04L 5/0023* (2013.01); *H04B 7/0413* (2013.01); *H04B 7/0697* (2013.01); *H04L 5/0046* (2013.01); *H04L 5/0048* (2013.01); *H04L 25/0204* (2013.01); *H04L 25/0224* (2013.01); *H04L 25/03343* (2013.01); *H04W 52/286* (2013.01)

(58) Field of Classification Search
None
See application file for complete search history.

(56) References Cited

U.S. PATENT DOCUMENTS

| | | | |
|---|---|---|---|
| 6,888,809 B1 | 5/2005 | Foschini et al. | |
| 2002/0154705 A1 | 10/2002 | Walton et al. | |

(Continued)

FOREIGN PATENT DOCUMENTS

| | | |
|---|---|---|
| KR | 10-2001-0076252 A | 8/2001 |
| KR | 10-2003-0007481 A | 1/2003 |
| WO | WO 2004/077730 A2 | 9/2004 |

*Primary Examiner* — Samina Choudhry
(74) *Attorney, Agent, or Firm* — Birch, Stewart, Kolasch & Birch, LLP (57) ABSTRACT

A data transmission apparatus having a plurality of antennas in a frequency division multiplexing system is provided. The apparatus includes a demultiplexer for splitting first-type data into plural pieces of sub-data, a first precoder for mapping the plural pieces of sub-data to the plurality of antennas by applying a first weight, a second precoder for mapping second-type data with an attribute different from the first-type data to the plurality of antennas by applying a second weight, and a transmit processor for transmitting the first-type data together with the second-type data through the plurality of antennas. Coverage can be expanded, and different types of services can be concurrently provided and system management can be achieved with increased flexibility and reliability.

7 Claims, 6 Drawing Sheets

(56) References Cited

U.S. PATENT DOCUMENTS

2003/0133426 A1\* 7/2003 Schein et al. ............... 370/337
2004/0013180 A1 1/2004 Giannakis et al.
2006/0121944 A1\* 6/2006 Buscaglia et al. ............ 455/561
2009/0238289 A1\* 9/2009 Sampath et al. .............. 375/260
2009/0265366 A1\* 10/2009 Marshall-Wilson et al. . 707/100

\* cited by examiner

APPARATUS AND METHOD FOR TRANSMITTING DATA USING MULTIPLE ANTENNAS

This application is the National Phase of PCT/KR2009/007110 filed on Dec. 1, 2009, which claims priority under 35 U.S.C. 119(e) to U.S. Provisional Application No. 61/119,379 filed on Dec. 3, 2008 and under 35 U.S.C. 119(a) to Patent Application No. 10-2009-0009012 filed in Korea on Feb. 4, 2009, all of which are hereby expressly incorporated by reference into the present application.

TECHNICAL FIELD

The present invention relates to wireless communications, and more particularly, to an apparatus and method for transmitting data by using multiple antennas.

BACKGROUND ART

Communication services have experienced a fast growing demand, for example, generalization of information communication services, introduction of various multimedia services, and advent of high-quality services. To meet such a demand, various wireless communication techniques have been studied in many fields.

In next generation wireless communication systems, high quality and massive multimedia data is expected to be transmitted at a high speed by using limited frequency resources. To achieve this, a spectral efficiency has to be maximized since a radio channel has a limited bandwidth. In addition, it is necessary to overcome inter-symbol interference and frequency selective fading which occur during high-speed transmission. Various techniques have been developed to maximize the spectral efficiency, and among them, an orthogonal frequency division multiplexing (OFDM) scheme and a multiple input multiple output (MIMO) scheme are most promising techniques.

The OFDM scheme uses a plurality of orthogonal subcarriers. Further, the OFDM scheme uses an orthogonality between inverse fast Fourier transform (IFFT) and fast Fourier transform (FFT). A transmitter transmits data by performing IFFT. A receiver restores original data by performing FFT on a received signal. That is, IFFT is used to combine multiple subcarriers, and FFT is used as a counterpart operation of the IFFT to split the multiple subcarriers. According to the OFDM scheme, complexity of the receiver can be reduced in a frequency selective fading environment of a broadband channel, and the spectral efficiency can be improved through selective scheduling in a frequency domain by utilizing channel characteristics which are different from one subcarrier to another. An orthogonal frequency division multiple access (OFDMA) scheme is an OFDM-based multiple access scheme. According to the OFDMA scheme, a radio resource can be more efficiently used by allocating different sub-carriers to multi-users.

The MIMO scheme can be mainly used for two purposes. A first purpose is to increase a diversity gain in order to reduce performance degradation resulted from a channel fading environment. A second purpose is to increase a data transmission rate in the same frequency band. The latter is referred to as a spatial multiplexing (SM) scheme. The MIMO scheme outperforms a single-input single-output (SISO) system using one transmit (Tx)/receive (Rx) antenna in terms that more data can be transmitted without having to increase the frequency band.

A MIMO channel provided by multiple antennas can be decomposed into independent channels. When Nt denotes the number of Tx antennas and Nr denotes the number of Rx antennas, it can be related as Ni=min{Nt, Nr} where Ni is the number of independent channels. Each independent channel can be referred to as a spatial layer. In general, a rank is defined as the number of non-zero eigenvalues of a MIMO channel matrix.

In a MIMO system, a transmitter performs precoding which multiplies a Tx signal by a weight. The precoding is a scheme for transmitting a Tx signal by pre-processing the Tx signal by using a weight. The weight is selected or calculated based on a channel to be experienced by the Tx signal. In general, in a frequency division duplex (FDD) system, a receiver determines a weight and transmits the weight to the transmitter, and the transmitter determines a weight to be used in actual transmission on the basis of the reported weight. In a time division duplex (TDD) system, the transmitter determines the weight by using a sounding channel.

A model for an Rx signal vector y is expressed by y=HWS+N. Herein, H denotes a channel matrix, W denotes a weight, S denotes a signal vector, and N denotes a noise vector. The weight W may have a matrix form or a vector form. A common pilot is used to estimate the channel matrix H. A precoded pilot is used to estimate HW. That is, the receiver uses HW obtained from the precoded pilot in order to detect S.

Advantageously, the precoded pilot can directly detect S by using an effective channel HW. When the precoded pilot is used in rank 1 transmission, a signal to noise ratio (SNR) gain can be expected in channel estimation, and thus reliability of channel estimation performance can be increased. When the precoded pilot is used in rank 2 (or higher) transmission, in addition to the advantage of obtaining the SNR gain in channel estimation, throughput enhancement can be expected.

When using the SM scheme, different pieces of data can be simultaneously transmitted in a parallel manner, thereby improving a data transmission rate. Each data may be transmitted to only one user equipment (UE), or may be transmitted to a plurality of UEs. Even if the plurality of UEs exist in a cell, each UE experiences various channel conditions according to a movement speed of each UE or a location thereof in the cell. In this case, if the SM scheme is applied by additionally inserting new data into original data, there is a disadvantage in that efficiency of resource utilization deteriorates. The reason above is that a portion of a spatial resource (i.e., a Tx antenna or a weight vector) to be allocated to the original data has to be allocated to the new data since the inserted data is also considered as one of multiple pieces of data similarly to sub-data which is obtained by demultiplexing the original data.

In addition, if the SM scheme is applied by demultiplexing both the original data and the inserted data, the number of pieces of sub-data increases and thus complexity increases. Further, the number of pilot signals to be transmitted also increases. Therefore, there is a disadvantage in that a pilot overhead increases.

Accordingly, there is a need for an apparatus and method capable of effectively transmitting several types of data by using multiple antennas.

DISCLOSURE OF INVENTION

Technical Problem

The present invention provides a method and apparatus for transmitting data with various attributes by using a plurality of antennas.

The present invention also provides a method and apparatus for transmitting data to facilitate channel estimation by using a plurality of antennas.

Technical Solution

According to an aspect of the present invention, a data transmission apparatus having a plurality of antennas in a frequency division multiplexing system is provided. The apparatus includes a demultiplexer for splitting first-type data into plural pieces of sub-data, a first precoder for mapping the plural pieces of sub-data to the plurality of antennas by applying a first weight, a second precoder for mapping second-type data with an attribute different from the first-type data to the plurality of antennas by applying a second weight, and a transmit processor for transmitting the first-type data together with the second-type data through the plurality of antennas.

According to another aspect of the present invention, a data transmission method using a plurality of antennas is provided. The method includes generating plural pieces of sub-data by demultiplexing first-type data, superposing second-type data with a different attribute from the first-type data to the plural pieces of sub-data, performing precoding for mapping to the respective antennas by applying a weight to the superposed plural pieces of sub-data and the second-type data, and transmitting the superposed plural pieces of sub-data and the second-type data.

According to yet another aspect of the present invention, a data reception method is provided. The method includes receiving a signal in which first-type data, second-type data, and a pilot signal for channel estimation of the first-type data are superposed, the second-type data having a different attribute from the first-type data, restoring the first-type data by using a first channel estimation value obtained from the pilot signal, obtaining a second channel estimation value for restoring the second-type data from the first channel estimation value, and restoring the second-type data from the second channel estimation value.

Advantageous Effects

According to the present invention, data with a different attribute is transmitted through multiple antennas. Therefore, coverage can be expanded, and different types of services can be concurrently provided. Further, since data with a different data transmission rate can be transmitted for each channel condition of a user equipment, system management can be achieved with increased flexibility and reliability.

MODE FOR THE INVENTION

Figure 1:
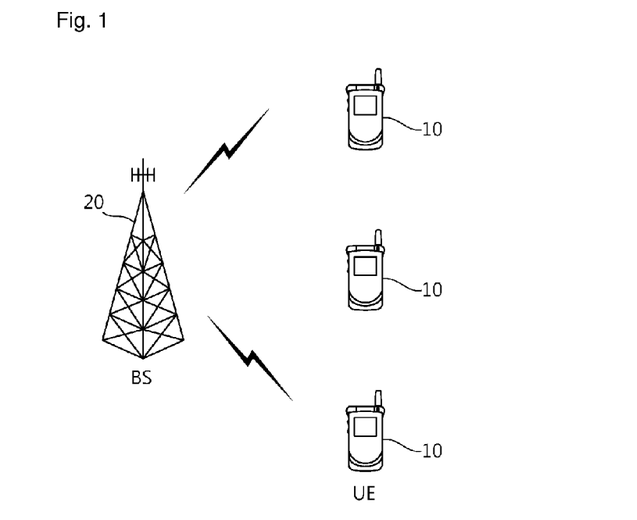
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

DL transmission and UL transmission may use different multiple access schemes. For example, DL transmission may use orthogonal frequency division multiple access (OFDMA), and UL transmission may use single carrier-frequency division multiple access (SC-FDMA) or clustered discrete Fourier transform spread orthogonal frequency division multiplexing (DFT-S-OFDM). All these belong to frequency division multiplexing (FDM) system.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system may operate by using various multiple antenna transmission and reception schemes such as frequency switched transmit diversity (FSTD), space frequency block coding (SFBC), space time block coding (STBC), cyclic delay diversity (CDD), time switched transmit diversity (TSTD), etc. In case of a rank 2 or higher ranks, other schemes can be further used, for example, spatial multiplexing (SM), generalized cyclic delay diversity (GCDD), selective virtual antenna permutation (S-VAP), etc.

The FSTD is a scheme for obtaining a diversity gain by allocating subcarriers of different frequencies to signals transmitted to respective multiple antennas. The SFBC is a scheme for ensuring both a diversity gain and a multi-user scheduling gain in a corresponding dimension by effectively using selectivity of a space domain and a frequency domain. The STBC is a scheme using selectivity of the space domain and a time domain. The CDD is a scheme for obtaining a diversity gain by using a path delay between respective Tx antennas. The TSTD is a scheme in which the signals transmitted to the multiple antennas are divided in the frequency domain. The SM is a scheme for improving a transfer rate by transmitting different data to each antenna. The GCDD is a scheme using selectivity of the time domain and the frequency domain.

Figure 2:
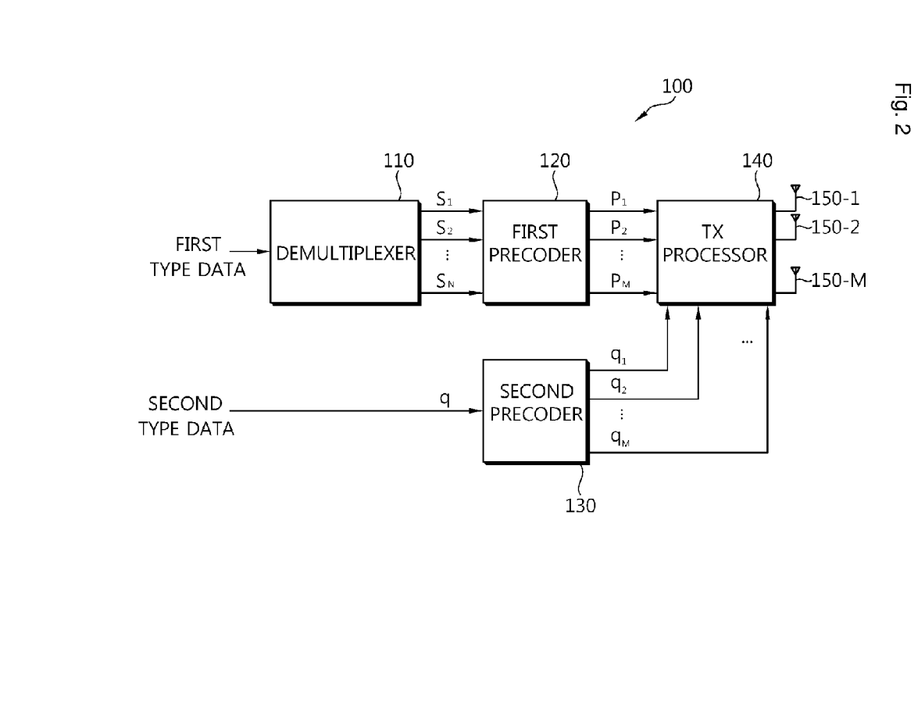
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes a demultiplexer 110, a first precoder 120, a second precoder 130, a transmit (Tx) processor 140, and M Tx antennas 150-1, ..., 150-M.

Before explaining constitutional elements of the transmitter 100, input data will be first explained. An input of the transmitter 100 includes first-type data and second-type data. The first-type data and the second-type data are coded by encoding and then mapped to a symbol of signal constellation by modulation. An attribute of the second-type data differs from an attribute of the first-type data. The attribute may be at least one of a data type (indicating whether data is user data or control information), a data modulation and coding scheme (MCS), a data delay requirement, a data throughput, and a data transport format.

For one example, a modulation and coding level of the first-type data is higher than a modulation and coding level of the second-type data. That is, the second-type data is subjected to coding and modulation so that the second-type data is transmitted with a lower data transmission rate than the first-type data.

For another example, the first-type data may be unicast data which uses a point-to-point bearer, and the second-type data may be multicast or broadcast data which uses a point-to-multipoint bearer.

For another example, the second-type data may be unicast data, and its data transmission rate may be properly controlled to be recoverable by a BS or a third UE located in a neighbor cell. Alternatively, the second-type data may be unicast data for a second UE which is located in the same cell as a first UE receiving the first-type data and of which a channel state is poorer than the first UE.

For another example, the second-type data may be data which requires a low time delay such as a voice over Internet protocol (VoIP) in comparison with the first-type data. That is, the second-type data is data of which a data transmission rate is decreased to be lower than that of the first-type data so as to have high reliability for the purpose of decreasing a probability of retransmission.

The first-type data or the second-type data can be obtained by 3 steps (not shown), that is, coding of an information bit, modulation of the coded information bit, and layer mapping. Coded data is referred to as a codeword. Modulation is mapping of the codeword to a symbol on signal constellation. There is no restriction on a modulation scheme. The modulation scheme may be m-phase shift keying (m-PSK) or m-quadrature amplitude modulation (m-QAM). For example, m-PSK may be BPSK, QPSK, or 8-PSK. m-QAM may be 16-QAM, 64-QAM, or 256-QAM.

The layer mapping defines a layer of an input symbol so that the first precoder 120 can distribute a specific symbol over a path of each antenna. A layer is defined as an information path input to the first precoder 120. An information path located ahead of the first precoder 120 may be referred to as a virtual antenna or a layer.

Hereinafter, constitutional elements of the transmitter 100 will be described.

The demultiplexer 110 splits the first-type data into N pieces of sub-data $\{s_1, s_2, \ldots, s_N\}$.

The first precoder 120 outputs data symbols $p_1, p_2, \ldots, p_M$ by applying a first weight to the plural pieces of sub-data, and maps the data symbols to the respective Tx antennas 150-1, ..., 150-M. Since N pieces of sub-data are input to the first precoder 120 and the number of Tx antennas is M, the first precoder 120 consists of M×N precoding matrices. Assume that sub-data $s_1$ and sub-data $s_2$ are input to the first precoder 120, and a precoding matrix is $$\begin{bmatrix} 1 & 1 \\ -1 & 1 \end{bmatrix},$$

then $[1 -1]^T$ and $[1\ 1]^T$ corresponding to each column are weight vectors. Data mapped to each Tx antenna is expressed by Equation 1.

MathFigure 1

$$\begin{bmatrix} 1 & 1 \\ -1 & 1 \end{bmatrix} \times \begin{bmatrix} s_1 \\ s_2 \end{bmatrix} = \begin{bmatrix} s_1 + s_2 \\ -s_1 + s_2 \end{bmatrix} \quad \text{[Math. 1]}$$

That is, the first Tx antenna is mapped with $s_1+s_2$, and the second Tx antenna is mapped with $-s_1+s_2$. The sub-data $s_1$ is mapped to the first Tx antenna by applying a weight of 1, and is mapped to the second Tx antenna by applying a weight of $-1$. The sub-data $s_2$ is mapped to the first and second Tx antennas by applying a weight of 1.

Assume that $U=[u_1, u_2, \ldots, u_n]$ is a precoding matrix constituting the first precoder 120. Herein, $u_n$ is an M×1 weight vector of sub-data n of the first-type data. In this case, the outputs $p_1, p_2, \ldots, p_M$ of the first precoder 120 are expressed by Equation 2.

MathFigure 2

$$\begin{bmatrix} p_1 \\ p_2 \\ \ldots \\ p_M \end{bmatrix} = U \begin{bmatrix} s_1 \\ s_2 \\ \ldots \\ s_N \end{bmatrix} \quad \text{[Math. 2]}$$

Meanwhile, if U is a unitary matrix, $u_i^H \cdot u_k = 0$ ($i \neq k$) is satisfied. If U is an identify matrix, the output of the first precoder 120 satisfies a relation of $p_1=s_1, p_2=s_2, \ldots, p_M=s_M$.

The second precoder 130 maps the second-type data to each of Tx antennas 150-1, ..., 150-M by applying a second weight. A weight vector depending on the second weight (hereinafter, a second weight vector) is determined by weight vectors (hereinafter first weight vectors) of the first precoder 120. For one example, a second weight vector v applied to the second-type data is expressed by a sum of the first weight vectors, that is, $$\sum_{n=1}^{N} u_n.$$

For another example, the second weight vector v applied to the second-type data is expressed by a linear combination form of the first weight vectors, that is, $$\sum_{n=1}^{N} a_n u_n.$$

Herein, $a_n$ is a known linear combination coefficient.

Linear combination coefficients may be fixed values, or may be values which vary in a time or frequency domain according to a rule known by both a transmitter and a receiver. In this manner, a diversity gain can be obtained. For example, when using a principle of phase sweep transmit diversity, the linear combination coefficient can be defined by Equation 3 below with respect to a time or frequency tone index k.

MathFigure 3

$$(a_1 a_2 \ldots a_n) = (e^{j\theta_1 k} e^{j\theta_2 k} \ldots e^{j\theta_n k}) \quad [\text{Math.3}]$$

That is, by using a coefficient that varies regularly, a diversity effect of the second-type data can be increased.

The first precoder 120 and the second precoder 130 may use codebook-based precoding. Each information path sent to one antenna by the first precoder 120 and the second precoder 130 by using one subcarrier mapper is defined as a stream. This may be referred to as a physical antenna. A signal $$y^{(p)}(i)$$

sent to each antenna port p can be expressed by Equation 4.

MathFigure 4

$$y(i) = [\ldots y^{(p)}(i) \ldots]^T \quad [\text{Math.4}]$$

The Tx processor 140 properly regulates Tx power of the first- and second-type data to maintain power of each Tx antenna, and transmits the outputs $p_1, p_2, \ldots, p_M$ of the first precoder 120 and outputs $q_1, q_2, \ldots, q_m$ of the second precoder 130 by processing these outputs together according to a mathematical formula.

The Tx processor 140 may slightly decrease Tx power of each sub-data of the first-type data by $\Delta p$, and allocate the decreased Tx power ($\Delta p$) to the second-type data. Then, the Tx processor 140 may superpose the sub-data of the first-type data and the second-type data and transmit the superposed data. If $s_m$ denotes a sub-data symbol of first-type data mapped to a Tx antenna m, and q denotes a symbol of second-type data mapped to the Tx antenna m, then $s_m+q$ is a signal transmitted from the Tx antenna m. In this case, to maintain Tx power of each Tx antenna, Tx power of the first- and second-type data is properly regulated to satisfy Equation 5 below.

MathFigure 5

$$E[s_m]^2 + E[q]^2 \leq P_m \quad [\text{Math.5}]$$

Herein, $E[x]^2$ denotes power of x, and $P_m$ denotes maximum Tx power of a Tx antenna m.

The Tx processor 140 may superpose the first-type data and the second-type data. When U denotes a first precoding matrix and v denotes a second precoding matrix, an output R of the Tx processor 140 is $U[s_1 \, s_2 \ldots s_N]^T + vq$.

The Tx processor 140 uses either an SC-FDMA scheme or an OFDM scheme according to a multiple access scheme. When the Tx processor 140 outputs an OFDM symbol by modulating an input symbol by using the OFDM scheme, inverse fast Fourier transform (IFFT) may be performed on the input symbol, and a cyclic prefix (CP) may be inserted to a time-domain symbol processed with the IFFT. The OFDM symbol generated in this manner is transmitted through each of the Tx antennas 150-1, . . . , 150-M.

When the Tx processor 140 outputs an SC-FDMA symbol by modulating the input symbol by using the SC-FDMA scheme, discrete Fourier transform (DFT) and IFFT may be performed on the input symbol.

In a MIMO system, the transmitter 100 may operate in two modes. One is a single codeword (SCW) mode, and the other is a multiple codeword (MCW) mode. When in the SCW mode, Tx signals transmitted through a MIMO channel have the same data transmission rate. When in the MCW mode, data transmitted through the MIMO channel may be independently encoded, and thus the Tx signals may have different data transmission rates. The MCW mode operates when a rank is 2 or higher.

Figure 3:
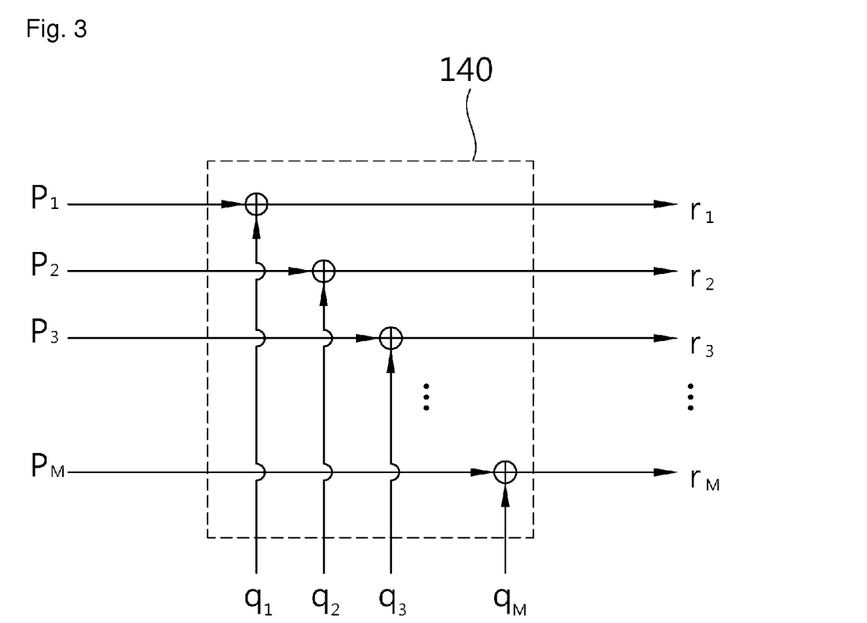
FIG. 3 is a diagram for explaining a method of operating a Tx processor according to an embodiment of the present invention.

FIG. 3 is a diagram for explaining a method of operating a Tx processor according to an embodiment of the present invention.

Referring to FIG. 3, the Tx processor 140 receives an output P of the first precoder 120 and an output Q of the second precoder 130, and outputs an output R. Herein, $P = [p_1 \, p_2 \ldots p_M]^T = U[s_1 \, s_2 \ldots s_N]^T$, $Q = [q_1 \, q_2 \ldots q_M]^T = vq$, and $R = [r_1 \, r_2 \ldots r_M]^T$.

The Tx processor 140 superposes the inputs. Superposition may be a simple sum of the inputs, or may be a linear combination of the inputs. For one example, if the super-position is the simple sum of the inputs, the output R of the Tx processor 140 is P+Q. For another example, if the superposition is the linear combination of the inputs, the output R of the Tx processor 140 is xP+yQ. Herein, x and y are linear coefficients, and are expressed with 1×M vectors. The Tx processor 140 properly regulates Tx power of first- and second-type data to maintain Tx power of each Tx antenna. When using an open loop SM scheme, U may be regarded as an identity matrix. This will be described below with reference to FIG. 4.

When the second-type data is superposed to the sub-data of the first-type data, the Tx processor 140 may apply a space-time code (STC). For example, in case of using two Tx antennas in the open loop SM, at a first time, a first Tx antenna transmits $s_1(1)+q(1)$, and a second Tx antenna transmits $s_2(1)+q(2)$. Further, at a second time, the first Tx antenna transmits $s_1(2)-q^*(2)$, and the second Tx antenna transmits $s_2(2)+q^*(1)$. Herein, s(t) denotes a data symbol of each sub-data corresponding to a time t, and x* denotes a complex conjugate number. In this case, a receiver restores the second-type data by using a decoder for performing a counterpart operation of the applied STC, then removes interference thereof, and then restores again the first-type data. Accordingly, diversity of the second-type data can be increased.

Figure 4:
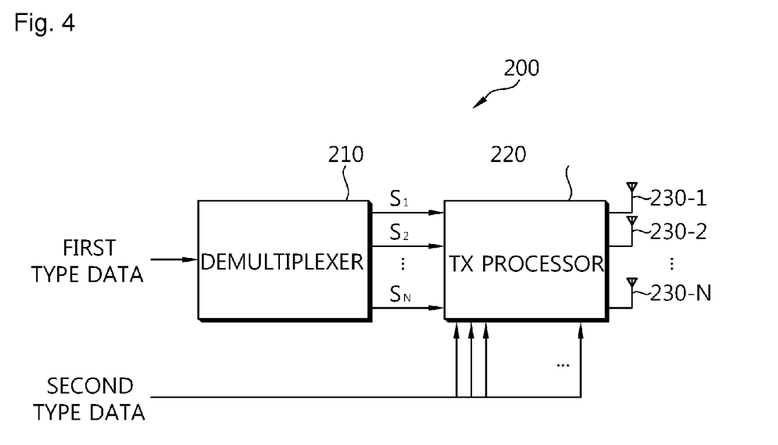
FIG. 4 is a block diagram showing a transmitter according to another embodiment of the present invention.

FIG. 4 is a block diagram showing a transmitter according to another embodiment of the present invention.

Referring to FIG. 4, a transmitter 200 includes a demultiplexer 210, a Tx processor 220, and Tx antennas 230-1, 230-2, . . . , 230-N.

The transmitter 200 receives first- and second-type data. Descriptions on the first- and second-type data are the same as those explained for the transmitter 100 of FIG. 2.

The demultiplexer 210 splits the first-type data into N pieces of sub-data $\{s_1, s_2, \ldots, s_N\}$. The Tx processor 220 superposes the N pieces of sub-data to the second-type data, generates a Tx symbol according to a specific multiple access scheme, and transmits the generated Tx symbol. When the open loop SM scheme is used, weights are not separately applied to the first- and second-type data as in the transmitter 200. Instead, the first-type data and the second-type data are directly superposed.

Figure 5:
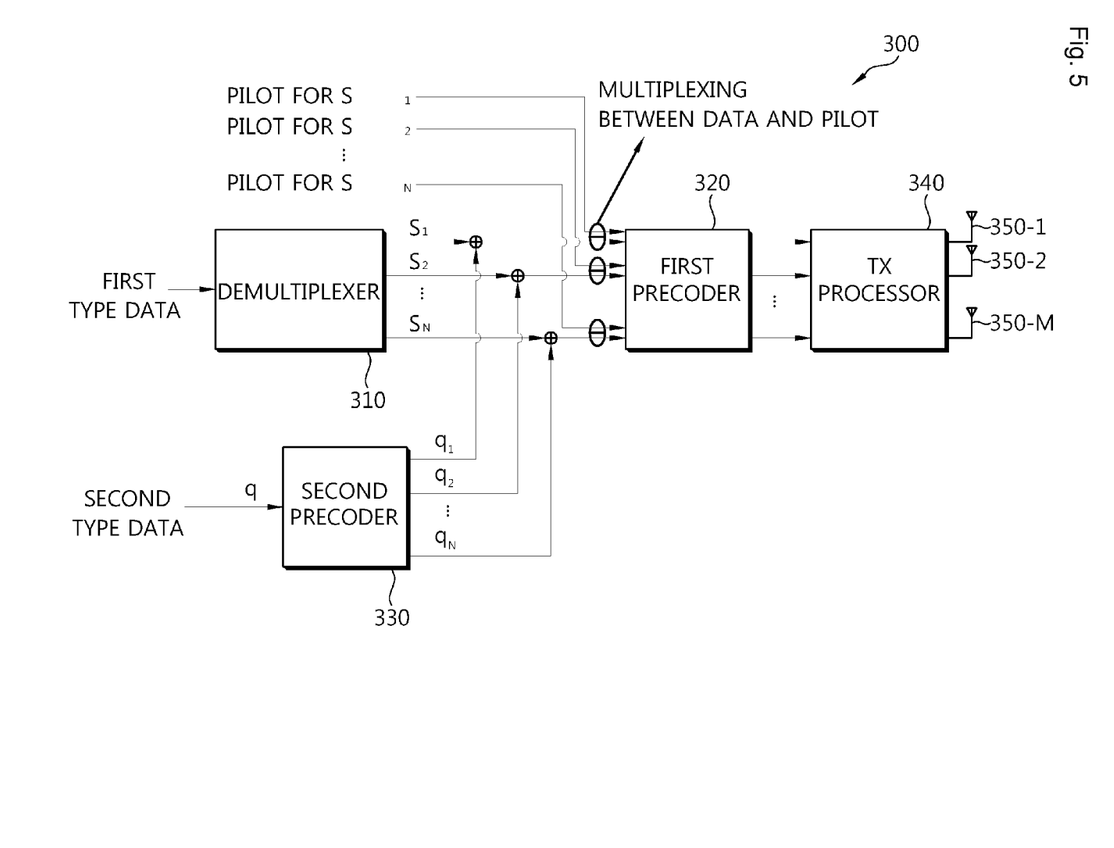
FIG. 5 is a block diagram showing a transmitter according to another embodiment of the present invention.

FIG. 5 is a block diagram showing a transmitter according to another embodiment of the present invention.

Referring to FIG. 5, a transmitter 300 includes a demultiplexer 310, a first precoder 320, a second precoder 330, a Tx processor 340, and M Tx antennas 350-1, . . . , 350-M.

The demultiplexer 310 splits the first-type data into N pieces of sub-data $\{s_1, s_2, \ldots, s_N\}$. The second precoder 330 performs precoding on second-type data q to output N symbols $\{q_1\ q_2 \ldots q_N\}$. Among the N pieces of sub-data and the N symbols, those having the same index N are superposed to each other and are then input to the first precoder 320. That is, an output of the second precoder 330 becomes an input of the first precoder 320. The outputs of the first precoder 320 and the second precoder 330 are not individually input to the Tx processor 330. This is different from the transmitter 100 of FIG. 2.

A pilot signal is also input to the first precoder 320. The pilot signal is a pilot for channel estimation of the first-type data. That is, $s_n$-$q_n$, a pilot for sub-data $s_1$, a pilot for sub-data $s_2, \ldots$, a pilot for sub-data $s_N$ are multiplexed and then are input to the first precoder 320. As such, when pilot signals are transmitted by being precoded by the first precoder 320, the receiver can directly use a value that is the product between a channel and the pilot signal without having to separately detect a pilot for channel estimation, which advantageously facilitates channel estimation. A signal T received by the receiver has a form as expressed by Equation 6 below.

MathFigure 6

$$T = HU[s_1 s_2 \ldots s_N]^T + Hvq \quad [\text{Math.6}]$$

Herein, H denotes a transport channel, and is an L M matrix where the number of Rx antennas is L. U is a precoding matrix of the first precoder 320. v is a weight vector of the second precoder 330 and is expressed by $$\sum_{n=1}^{N} a_n u_n$$

where $u_n$ is a vector of the first precoder 320. As can be seen herein, the second-type data is transmitted through an L×1 channel matrix expressed by Hv, and thus the number of Tx antennas for the second-type data may be recognized as 1 from the perspective of the receiver. Further, since v is a value obtained by linearly combining vectors of U, a channel for the second-type data is represented with a sum of channels for sub-data of the first-type data.

In terms of power, v is $[1\ 1 \ldots 1]^T$ when the transmitter 300 uses the open loop SM scheme and thus a precoding matrix of the first precoder 320 is an identity matrix and all components of a precoding matrix of the second precoder 330 is 1. As a result, total Tx power is M×$P_2$. Herein, $P_2$ corresponds to $E[q]^2$ that is Tx power of second-type data for each Tx antenna. That is, from the perspective of the receiver, there is an advantage in that the second-type data appears to be transmitted with Tx power as M times as that of a case of using a single Tx antenna. The Tx processor 340 generates a Tx symbol by using an output of the first precoder 320, and transmits the Tx symbol according to the multiple access scheme.

Although it is shown in FIG. 5 that a pilot signal is an input of the first precoder 320, this is for exemplary purposes only. Thus, the pilot signal may be added to an output of the first precoder 320 and thus may be used as an input of the Tx processor 340. In this case, restoring of the first- and second-type data by using the pilot signal may be different, which will be described below.

Figure 6:
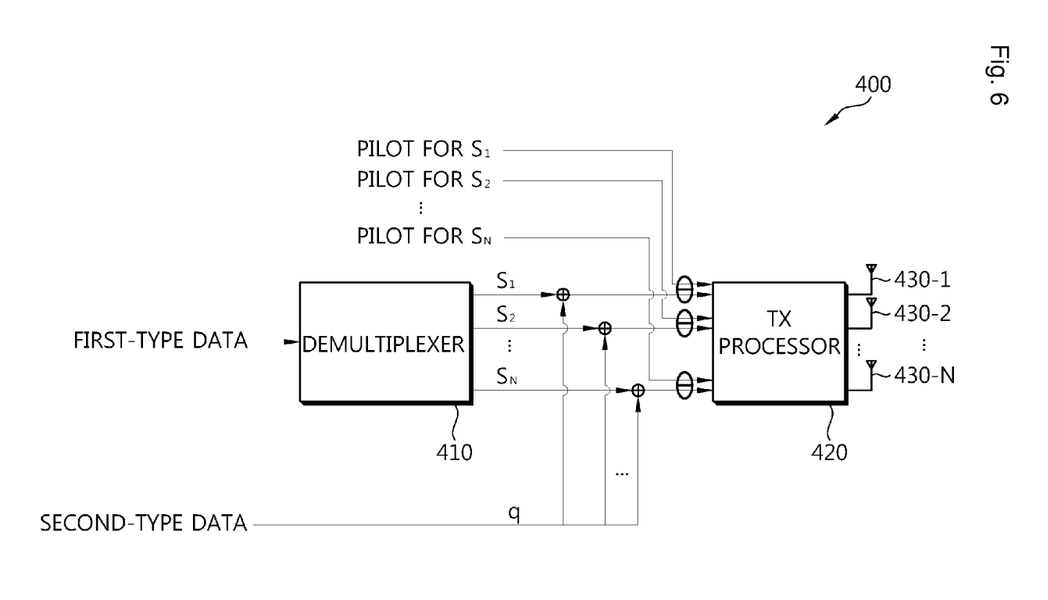
FIG. 6 is a block diagram showing a transmitter according to another embodiment of the present invention.

FIG. 6 is a block diagram showing a transmitter according to another embodiment of the present invention.

Referring to FIG. 6, a transmitter 400 includes a demultiplexer 410, a Tx processor 420, and Tx antennas 430-1, 430-2, . . . , 430-N. Since the transmitter 400 uses the open loop SM scheme, a weight is not applied when first-type data and second-type data are mapped to each Tx antenna.

Figure 7:
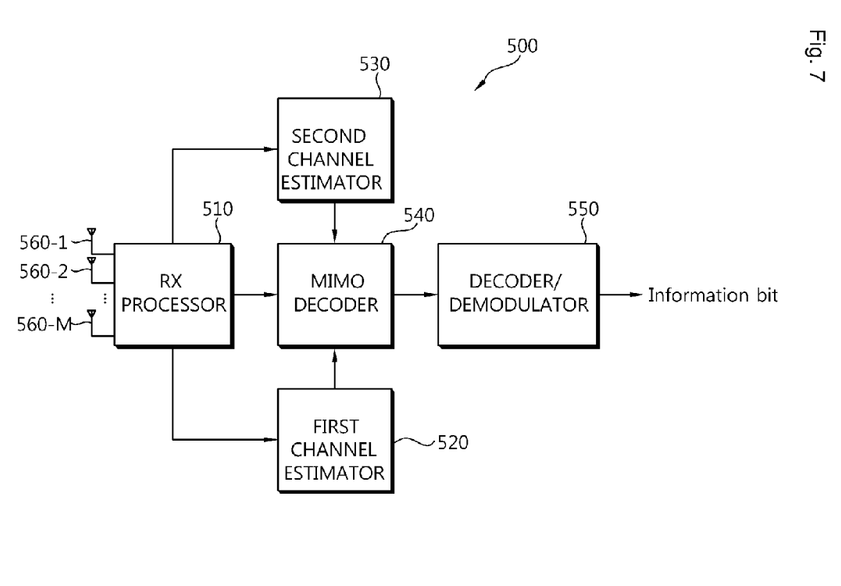
FIG. 7 is a block diagram showing a receiver according to an embodiment of the present invention.

FIG. 7 is a block diagram showing a receiver according to an embodiment of the present invention.

Referring to FIG. 7, a receiver 500 includes an Rx processor 510, a first channel estimator 520, a second channel estimator 530, a MIMO decoder 540, a decoder/demodulator 550, and M Rx antennas 560-1, 560-2, . . . , 560-M.

The Rx processor 510 demodulates an Rx signal provided from the M Rx antennas 560-1, 560-2, . . . , 560-M according to a multiple access scheme (i.e., OFDM or SC-FDMA).

The first channel estimator 520 estimates a channel for first-type data. The second channel estimator 530 estimates a channel for second-type data. The first channel estimator 520 and the second channel estimator 530 operate differently according to whether the Rx signal is received by using an open loop SM scheme or a closed loop SM scheme.

First, if the Rx signal is received by using the open loop SM scheme, the first channel estimator 520 estimates a channel for each sub-data of the first-type data by detecting a pilot that is a reference signal of each Tx antenna of a transmitter. A channel estimated for each sub-data is referred to as a first channel estimation value. This is because a channel for each sub-data of the first-type data coincides with a channel for a pilot of each Tx antenna in the open loop SM scheme.

The second channel estimator 530 estimates a channel for the second-type data by using the first channel estimation value and information regarding linear combination coefficients constituting a weight vector of the second-type data. A linear combination coefficient $a_n$ can be defined as expressed by Equation 3 above. The weight vector of the second-type data can be defined as $$\sum_{n=1}^{N} a_n u_n$$

which is an equation for obtaining a sum of all products between the linear combination coefficient and the precoding matrix U of the first-type data. Therefore, the second channel estimator 530 may estimate the channel for the second-type data by linearly combining first channel estimation values. A channel estimation value of the second-type data is referred to as a second channel estimation value. As such, the second channel estimator 530 can perform channel estimation of the second-type data without having to use an additional pilot for the second-type data.

Next, when the Rx signal is received by using the closed loop SM scheme and the precoding matrix is not an identity matrix, the first channel estimator 520 first obtains a first channel estimation value.

For example, a pilot can be precoded similarly as in each sub-data. The first channel estimator 520 obtains HU as the first channel estimation value instead of a channel value H. This is because the pilot is applied with a weight by the precoding matrix. The second channel estimator 530 can obtain a second channel estimation value Hv by using information regarding the linear combination coefficients constituting the weight vector of the second-type data. Herein, Hv is $$\sum_{n=1}^{N} a_n H u_n.$$

In this case, channel estimation of the second-type data does not require an additional pilot.

For another example, the pilot may not be precoded while the first- and second-type data is precoded. The first channel estimator 520 first estimates a first channel estimation value H by detecting a pilot signal for each Tx antenna. The second channel estimator 530 can calculate a second channel estimation value of the second-type data on the basis of information regarding a weight vector ($u_N$ or v) applied to each sub-data of the first-type data and the second-type data. For this, the receiver has to know which weight vector (or precoding matrix) is applied to each sub-data according to a higher-layer signal or a protocol defined in a standard.

For example, if the second-type data is a control signal of the first-type data, the following operation may be performed. First, it is assumed that the transmitter and the receiver know in advance a weight vector of the second-type data according to the higher-layer signal or the protocol defined in the standard. The second channel estimator 530 multiplies the weight vector by a first channel estimation value H estimated using a pilot signal for each Tx antenna to obtain a second channel estimation value for the second-type data. The second-type data restored using the second channel estimation value includes precoding matrix information used for the first-type data. The transmitter may allow the second-type data to include this information. The receiver can know a precoding matrix used for the first-type data by restoring the second-type data. The first channel estimator 520 may perform precoded channel estimation for the first-type data. Of course, a dedicated reference signal (RS) for the second-type data can be used to improve channel estimation performance.

The MIMO decoder 540 performs post-processing as a counterpart operation of the precoder of the transmitter. Upon receiving superposed first- and second-type data, the MIMO decoder 540 first restores the second-type data by regarding sub-data of the first-type data as interference. Of course, the transmitter determines an MCS and Tx power of the second-type data so that the second-type data can be recovered under the interference of the first-type data. In addition, the transmitter determines an MCS and Tx power of the first-type data under the assumption that the first-type data is not interfered with the second-type data. The MIMO decoder 540 performs interference cancellation according to the restored second-type data, and then restores the first-type data in a situation where interference of the second-type data is cancelled. The first-type data can be restored by using various SM-based receiving methods. The decoder/demodulator 550 demaps an input symbol into coded data, and restores an original information bit by decoding the coded data.

Figure 8:
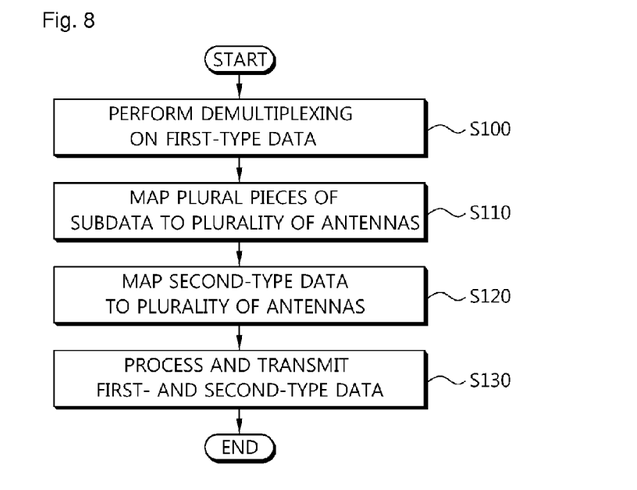
FIG. 8 is a flowchart showing a data transmission method according to an embodiment of the present invention.

FIG. 8 is a flowchart showing a data transmission method according to an embodiment of the present invention.

Referring to FIG. 8, first-type data is subjected to demultiplexing (step S100). Plural pieces of sub-data are generated as a result of demultiplexing. The plural pieces of sub-data are mapped to a plurality of antennas by applying a first weight (step S110). Second-type data with a different attribute from the first-type data is mapped to the plurality of antennas by applying a second weight (step S120). The first-type data and the second-type data are processed and transmitted (step S130). The first-type data and the second-type data may be superposed to each other. The superposition may be a simple summation or a linear combination.

Figure 9:
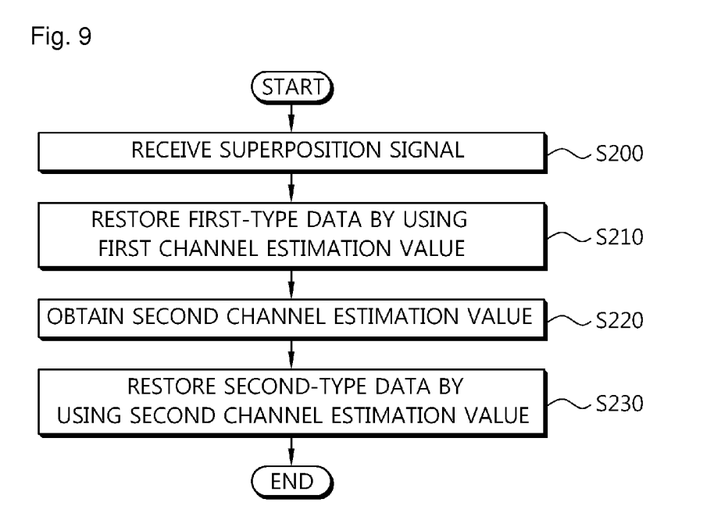
FIG. 9 is a flowchart showing a data reception method according to an embodiment of the present invention.

FIG. 9 is a flowchart showing a data reception method according to an embodiment of the present invention.

Referring to FIG. 9, a superposition signal including first-type data, second-type data, and a pilot signal is received (step S200). The first- and second-type data may be applied with a weight by using a different or identical precoding matrix. The pilot signal may or may not be applied with a weight by using a precoding matrix. The second-type data may be control information including information regarding a precoding matrix applied to the first-type data. If data has a characteristic of the control information in terms that a data transmission rate is low and communication can be achieved with a small amount of resources, a spatial resource usable by the first-type data does not have to be allocated to the second-type data, thereby enabling effective use of resources. The first-type data is restored by using a first channel estimation value for a channel through which the first-type data is transmitted (step S210). A second channel estimation value is obtained by using the first channel estimation value and a linear combination coefficient of a weight vector for the second-type data (step S220). The second channel estimation value is a channel estimation value for a channel experienced by the second-type data. The second-type data is restored by using the second channel estimation value (step S230).

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

The invention claimed is:

1. A data transmission apparatus having a plurality of antennas in a frequency division multiplexing system, the data transmission apparatus comprising:
   a demultiplexer for splitting first-type data into plural pieces of sub-data;
   a first precoder for mapping the plural pieces of sub-data to the plurality of antennas by applying a first weight;
   a second precoder for mapping second-type data with a different attribute from the first- type data to the plurality of antennas by applying a second weight, wherein the attribute is related to at least one of a data type, a data modulation and coding scheme (MCS), a data delay requirement, a data throughput, and a data transport format; and
   a transmit processor for transmitting the first-type data and the second-type data through the plurality of antennas,
   wherein the first-type data and the second-type data are superposed by a linear combination,
   wherein a weight vector based on the second weight is obtained by linearly combining weight vectors based on the first weight,
   wherein a linear combination coefficient is used to obtain the weight vector, where the linear combination coefficient is varied in a time or frequency domain regularly so as to increase a diversity effect of the second-type data,
   wherein the first precoder and the second precoder use codebook-based precoding,
   wherein a transmit power of the first-type data and the second-type data is properly regulated to maintain a transmit power of each transmit antenna, and
   wherein the second-type data is control information for transmission of the first-type data such that a spatial resource usable by the first-type data is not allocated to the second-type data.

2. The data transmission apparatus of claim 1, wherein the first-type data is unicast data which uses a point-to-point bearer.

3. The data transmission apparatus of claim 1, wherein the second-type data is multicast or broadcast data which uses a point-to-multipoint bearer.

4. The data transmission apparatus of claim 1, wherein a data transmission rate of the first-type data is higher than a data transmission rate of the second-type data.

5. The data transmission apparatus of claim 1, wherein the second-type data is control information for transmission of the first-type data.

6. The data transmission apparatus of claim 1, wherein the first precoder maps a pilot signal together with the plural pieces of sub-data to the plurality of the antennas.

7. The data transmission apparatus of claim 1, wherein the first-type data is restored by using a first channel estimation value for a channel through which the first-type data is transmitted, and a second channel estimation value is obtained by using the first channel estimation value and the linear combination coefficient of the weight vector for the second-type data.

* * * * *